Oct. 13, 1970    J. KRUSCHIK    3,533,287
LIQUID LEVEL INDICATOR
Filed Nov. 14, 1968

United States Patent Office 3,533,287
Patented Oct. 13, 1970

3,533,287
LIQUID LEVEL INDICATOR
Julius Kruschik, Gumpoldskirchen, Austria, assignor to Istag A.G. Suhr/A.G., Suhr, Switzerland
Filed Nov. 14, 1968, Ser. No. 775,730
Int. Cl. G01f 23/02
U.S. Cl. 73—331                7 Claims

ABSTRACT OF THE DISCLOSURE

A liquid level indicator of the type having an inspection glass inserted in a recess between an indicator body and a cover plate where a mica foil protects the glass and seals the liquid conduit provided in the indicator body. In order to prevent any bulging out of the mica foil in the pressureless state of the liquid conduit a passage is formed in the parts of the indicator surrounding the lateral surfaces of the inspection glass and opening in said recess for establishing a communication between the small gap or interstice existing between said mica foil and the adjoining surface of the inspection glass and atmosphere.

---

The invention relates to a liquid level indicator having an inspection glass which is protected by a foil, consisting more especially of mica, and which is held between an indicator body comprising the liquid conduit and a cover plate fixed in said body, the foil being supported by the inspection glass against the pressure in the liquid conduit and being pressed for sealing-off purposes by the cover plate against the indicator body with the marginal portions projecting beyond the inspection glass all around the latter. With liquid level indicators of this type, the glass is loaded to a lesser degree than with those types of construction in which the packing pressure for sealing-off the foil against the liquid conduit is conducted through the inspection glass.

The invention is concerned with the problem of increasing the effective life of the foil protecting the inspection glass, and is based on the knowledge that any bulging out of the foil (from the glass surface towards the liquid conduit) which occurs in the pressureless state reduces the life thereof. When such a bulging is present, it is compressed against the glass when pressure is admitted to the indicator, and this leads to damage in connection with many foils, more especially those of brittle materials, such as mica. It has now been found that such bulging of the foil inwardly is caused when the air present in the gap volume between inspection glass and foil is expanded on being heated in operation, more especially on being enriched with the gas or vapour, e.g. steam, which is in the liquid conduit. This is possible with the known indicators of the type initially referred to, because the inspection glass inserted in the cover plate comprises an elastic spacer serving to compensate for any unevenness on the surface of the glass supported against the cover plate, said spacer sealing off outwardly the gap around the inspection glass and also between the glass and foil.

As long as the indicator itself is operating, the same pressure is built up in both the gap and the liquid conduit. However, if the indicator is without pressure, due to an adjustment in operation or the like, the foil is bulged into the now pressureless liquid conduit by the excess pressure still existing in the gap.

Even when the glass lies loosely in the cover plate in the unpressurised state, it is pressed against the spacer in the operating condition (by the internal pressure acting on the foil and thus on the supporting glass), whereby the outward sealing is produced and a build-up of pressure in the gap is made possible. In operation, there are then produced the destructive effects which have been explained, there occurring all the more noticeably as the indicator is more often heated and cooled again, because frequently the excess pressure in the liquid conduit which prevents the bulging effect is lacking during these transitional conditions.

On the basis of this knowledge, an indicator of the type initially referred to is improved according to the invention by the fact that the gap existing between the foil and the supporting inspection glass communicates with the outside atmosphere by way of a passage which is provided in those parts of the indicator which surround the lateral surfaces and/or the margins of the front side of the inspection glass.

The production of the connection between these gaps and the outside atmosphere by passages can be effected by subdividing the elastic spacers into several pieces, because then a connection is produced at the places where the subdivision is made. This has the disadvantage that this spacer has to be fitted in several separate pieces, and this is quite difficult in many cases. Consequently, a liquid level indicator according to the invention is advantageously so constructed that the glass is mounted in a recess in the cover plate, which comprises an air-venting bore opening into the side wall of the recess. It is to be mentioned that air-venting bores in the cover plate are known in connection with indicators of a different type. With these known indicators, the packing pressure for sealing off the foil from the liquid conduit is supplied through the inspection glass; consequently, the packings are also provided in the region of the glass and a venting of the air from the gap between the foil and glass cannot be effected through a bore in the cover plate. This bore is only to prevent the rise in pressure between cover and indicator body and also depositions on the glass.

According to the invention, the inspection glass can also be inserted in the indicator body and be framed by a pressure ring transmitting the pressure of the cover plate to the marginal portions of the foil, said ring comprising recesses at the points of contact with the cover plate, the said recesses ensuring the communication between the outside atmosphere and the gaps around the inspection glass.

Furthermore, the tendency to bulge away from the glass towards the liquid conduit can be restricted by the cover plate being so fixed on the indicator body that it comprises a bend or set towards the liquid conduit. By the indicated direction of the set of the cover plate, the mica is in fact placed under tension, which acts against a bulging of the mica. The bending of the cover plate in the opposite direction, i.e. away from the liquid conduit, does in fact already cause an inward bulging of the foil without any regard to the expansion of the air or of the gas in the said gaps. The set of the cover plate towards the liquid conduit can be 0.05 to 0.5 mm.; in most cases, it is 0.1 to 0.2 mm.

With the method of construction in which the inspection glass is let into the indicator body and is framed by a pressure ring transmitting the pressure of the cover plate to the marginal portions of the foil, the bend or set of the cover plate towards the liquid conduit can be produced by the pressure ring projecting to a lesser degree beyond the indicator body than the outer bearing portions of the indicator body for the cover plate.

A further protection of the mica can be obtained if the gap necessarily existing between the side walls of the inspection glass and those parts of the indicator which surround these walls is bridged over in the region of the foil; in this way, the foil cannot be forced into the gap and no distortions occur at this position which produce destruction. It must naturally be ensured that this bridging over of the gap does not produce any sealing effect on the gap between the foil and inspection glass.

The invention is now explained by reference to examples of construction which are illustrated in the accompanying drawings.

Figure 1:
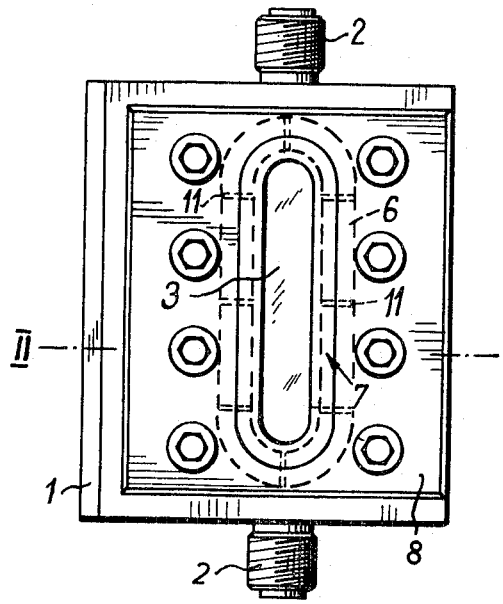
FIG. 1 is a plan view of a liquid level indicator according to the invention, seen in the direction of the arrow in FIG. 2.

The liquid level indicator according to the invention, as illustrated, is intended for high pressure steam boilers and comprises an indicator body 1 which is trapezoidal in cross-section, the liquid conduit 12 thereof communicating by means of unions 2 with the steam boiler. Let into the faces of the indicator body 1 are inspection glasses 3 which, like the said faces, are inclined at an angle to one another. This inclination serves to facilitate, by light refraction effects, the distinction of the water column from the steam. Since the indicator is intended for high steam pressures and the life of the glasses without protection would be very short, the said glasses are protected by thin mica spacers or foils 4.

A flat packing 5 is interposed between the mica 4 and indicator body 1 for providing a seal between the mica spacer and indicator body. For the necessary pressing of the mica 4 against the packing 5 and of the packing against the indicator body 1, the elongated inspection glass 3 is loosely surrounded by a pressure ring 6, which is in contact with those marginal portions of the mica 4 which project all around the inspection glass 3. The pressure ring 6 is pressed by means of a cover plate 8 having a slot 7 and by means of the associated fixing screws 9 against the mica 4 and the packing 5 disposed beneath the latter, whereby a sealing of the liquid conduit with respect to the mica is assured. With this construction, the inspection glass serves only for supporting the mica against the pressure in the liquid conduit and exerts practically no pressure on the packing, so that the stressing of the glass is relatively light. The glass 3 being not pressed against the mica, a very small gap or interstice will practically be present between the glass and the mica. The glass is in its turn supported against the cover plate 8 by interposition of an elastic spacer 10.

The pressure ring 6 comprises outwardly extending grooves 11 on the surface of contact with the cover plate 8, said grooves producing a reliable connection between the outside atmosphere and the small gap volume or interstice between the inspection glass 3 and the pressure ring 6 and the mica 4. This arrangement thus prevents an excess pressure relatively to the outside atmosphere being established in this gap. In the absence of these ventilating grooves an excess pressure could be formed in the sealed gap volume by the moist air contained therein being expanded on starting up or by steam diffusing throuh the mica foil into the said gap. On starting up the boiler, relatively little danger exists for the mica foil, because the pressure in the liquid conduit 12, on starting the boiler, rises similarly to that in the gap. On shutting off the boiler, however, it frequently happens that the pressure in the liquid conduit 12 falls more quickly than in the gap, whereby the mica is bulged towards the liquid conduit. If now the boiler is once again brought under pressure, the bulge of the mica is compressed, and because of its brittleness, this leads to serious damage, so that the effective life is greatly shortened. As another preventative measure against the mica bulging inwardly, the cover plate comprises a bend or set towards the liquid conduit. This is obtained by the supports for the cover plate 8 being of corresponding dimensions. At the outer margins, the cover plate is supported on the spacer strip 13, while inside it is supported on the pressure ring. These parts are now of such dimensions that the thickness $a$ of the spacer strip is larger by a few tenths of a millimetre than the dimension $b$ by which the pressure ring projects beyond the face of the indicator body when the cover plate 8 is fitted. The set or bend of the cover plate, directed towards the liquid conduit, is then propagated to the pressure ring, this causing the mica to be tensioned towards the sides in the region of the glass and thus offering a greater resistance to any bulging.

Existing between the inspection glass 3 and the pressure ring 6 is a gap, which is relatively large, particularly in the region of the foil, if the outer glass edges are bevelled. In certain circumstances, depending on the construction of the indicator, the state and nature of the medium, the foil can be pressed in this opening which is formed. This deformation can likewise lead to damage with brittle foils. In order to avoid this, the said gap opening can be bridged over, for example, by a strip which bears in front of the foil on the rim of the back of the inspection glass 3 and on the adjacent surface of the pressure ring. However, care is to be taken, by suitable choice of the material, or of the shape of the strip, that there is no sealing of the gap between the back of the inspection glass and the foil.

Figure 2:
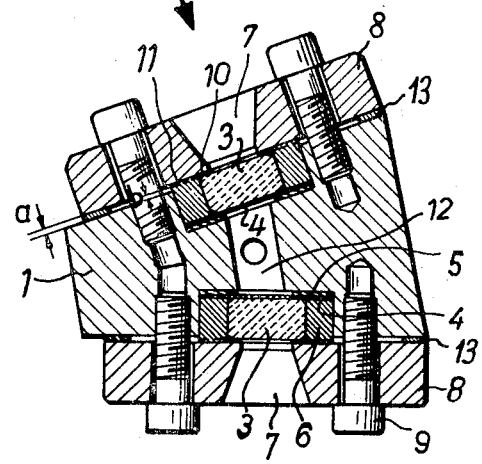
FIG. 2 is a transverse section through the indicator according to the line II—II of FIG. 1.
Figure 3:
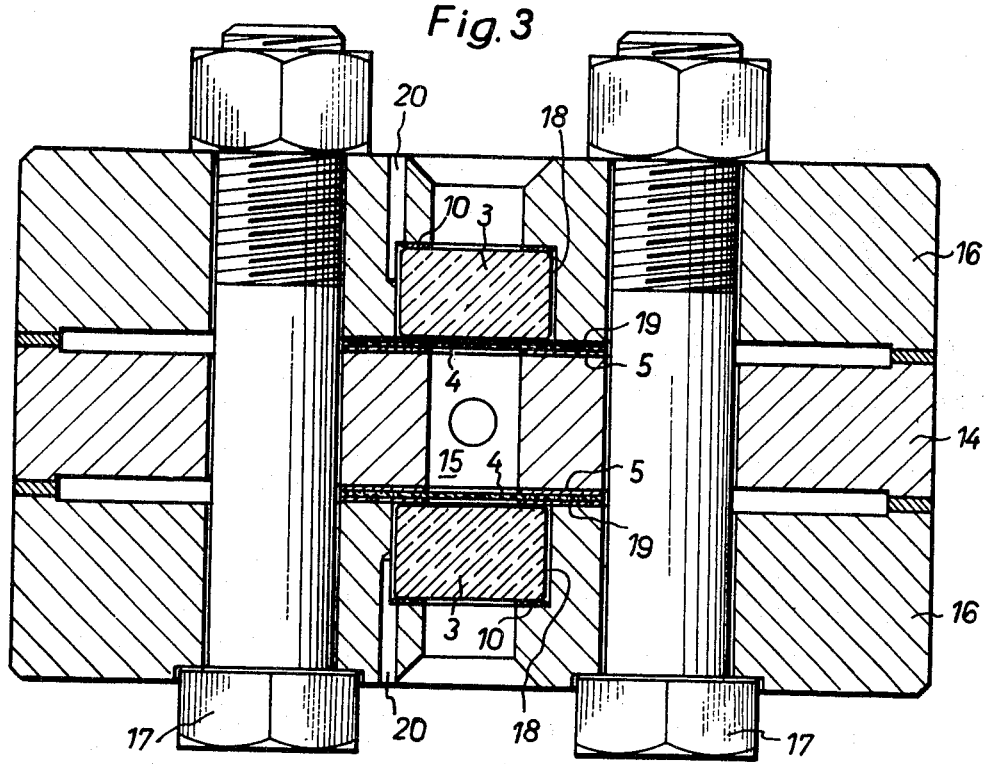
FIG. 3 is a transverse section through a modified indicator.

In the example according to FIG. 3 which operates in the same manner as that of FIGS. 1 and 2, the liquid level indicator comprises an indicator body 14 in which the liquid conduit 15 communicates with the steam boiler. Two cover plates 16 are disposed at the top and bottom sides of the indicator body 1 and the three superposed elements 14 and 16 are held together by means of screw bolts 17. An inspection glass 3 is mounted with a small lateral clearance in a recess 18 of each cover plate 16. The faces of the two glasses situated adjacent the liquid conduit 15 are protected each by a thin mica spacer 4. Packings 5 are inserted between the mica 4 and the indicator body 14, and further packings 19 are inserted between the mica 4 and the cover plates 16, so that a very small gap is formed between the mica and the adjacent face of the inspection glass 3 when no liquid pressure is present in the liquid conduit 15. The glasses 3 in turn are supported against the cover plates 16 by elastic spacers 10. The sealing of the liquid conduit 15 with respect to the mica spacer 4 is effected by the packings 5 when the three plates 14 and 16 are pressed together by the screw bolts 17.

In order to prevent an excess pressure building up in the sealed gas volume existing between the lower face and the lateral face of each glass 3, an air venting bore 20 opening into the side wall of the recess 18 is provided in each cover plate 16.

What is claimed is:
1. A liquid level indicator comprising an inspection glass having front and back sides, a heat resisting protecting foil for said glass, an indicator body having a liquid conduit, and a cover plate fixed on said body and having said glass mounted between said body and said cover plate, said foil being mounted in said body at the back side of said glass with a packing member to form an interstice with the back side of the glass, said foil being urged towards said back side of the inspection glass by the pressure in said liquid conduit, said foil having marginal portions projecting beyond and all around the inspection glass pressed by said cover plate against the indicator body, said indicator being provided with a passage surrounding the lateral surface and marginal portions of the front side of the inspection glass, said passage being in communication with the interstice between said foil and the back side of said inspection glass.

2. A liquid level indicator according to claim 1 in which said cover plate has a recess for said glass and an air-venting bore opening into the side wall of said recess and constituting said passage.

3. A liquid level indicator according to claim 1 in which the inspection glass is mounted in the indicator body and comprising a pressure ring surrounding the glass and transmitting pressure from the cover plate to the marginal portions of said foil, said ring having recesses at the points of contact with the cover plate which include said passage and provide communication between the ambient atmosphere and the interstices around the inspection glass.

4. A liquid level indicator according to claim 1 comprising means fixing the cover plate on the indicator body so that the cover plate is bent inwards towards the liquid conduit.

5. A liquid level indicator according to claim 4, in which the inward deflection of the cover plate is from 0.05 to 0.5 mm.

6. A liquid level indicator according to claim 4 in which the pressure ring projects beyond the body by an amount less than the height of the bearing surfaces on which the cover plate is supported on the body whereby to provide the inward bend of said cover plate.

7. A liquid level indicator according to claim 1 wherein interstices are provided between side walls of the glass and those parts of the indicator which surround these walls, the latter interstices being bridged over in the region of the foil.

References Cited

UNITED STATES PATENTS

| | | | |
|---|---|---|---|
| 1,703,426 | 2/1929 | Kerr | 73—330 |
| 1,734,566 | 11/1929 | Drumm | 220—44 |
| 2,263,644 | 11/1941 | Pierce | 220—44 |
| 2,882,730 | 4/1959 | Yarnall | 73—331 |
| 3,187,573 | 6/1965 | Guellner | 73—331 X |
| 3,317,079 | 5/1967 | Farrell et al. | 220—44 |
| 3,345,871 | 10/1967 | Andrea | 73—331 |

LOUIS R. PRINCE, Primary Examiner

D. M. YASICH, Assistant Examiner

U.S. Cl. X.R.

220—44